United States Patent
Tonelli et al.

(10) Patent No.: US 10,689,472 B2
(45) Date of Patent: *Jun. 23, 2020

(54) CROSSLINKABLE FLUOROPOLYMERS

(71) Applicant: SOLVAY SPECIALTY POLYMERS ITALY S.P.A., Bollate (IT)

(72) Inventors: Claudio Adolfo Pietro Tonelli, Paderno D'adda (IT); Ivan Wlassics, Garessio (IT); Alessio Marrani, Lecco (IT); Ivan Falco, Sedriano (IT); Giuseppe Marchionni, Milan (IT)

(73) Assignee: SOLVAY SPECIALITY POLYMERS ITALY S.P.A., Bollate (Milan) (IT)

(*) Notice: Subject to any disclaimer, the term of this patent is extended or adjusted under 35 U.S.C. 154(b) by 0 days.

This patent is subject to a terminal disclaimer.

(21) Appl. No.: 15/121,258

(22) PCT Filed: Feb. 25, 2015

(86) PCT No.: PCT/EP2015/053871
§ 371 (c)(1),
(2) Date: Aug. 24, 2016

(87) PCT Pub. No.: WO2015/128337
PCT Pub. Date: Sep. 3, 2015

(65) Prior Publication Data
US 2016/0369028 A1    Dec. 22, 2016

(30) Foreign Application Priority Data

Feb. 28, 2014 (EP) .................................. 14157169

(51) Int. Cl.
| | |
|---|---|
| C08F 2/46 | (2006.01) |
| C08F 2/50 | (2006.01) |
| C08G 61/04 | (2006.01) |
| C08F 259/08 | (2006.01) |
| C08F 214/22 | (2006.01) |
| C08F 214/18 | (2006.01) |
| C08F 299/00 | (2006.01) |
| C08J 3/24 | (2006.01) |
| C08J 3/28 | (2006.01) |
| C09D 151/00 | (2006.01) |

(52) U.S. Cl.
CPC .......... *C08F 259/08* (2013.01); *C08F 214/18* (2013.01); *C08F 214/186* (2013.01); *C08F 214/22* (2013.01); *C08F 214/225* (2013.01); *C08F 299/00* (2013.01); *C08J 3/246* (2013.01); *C08J 3/247* (2013.01); *C08J 3/28* (2013.01); *C09D 151/006* (2013.01); *C08J 2333/08* (2013.01); *C08J 2351/00* (2013.01)

(58) Field of Classification Search
CPC .... C08F 259/08; C08F 214/22; C08F 299/00; C08J 3/246; C08J 3/247; C08J 3/28; C08J 2351/00; C08J 2333/08
USPC ................. 522/33, 6, 1, 71, 189, 184; 520/1
See application file for complete search history.

(56) References Cited

U.S. PATENT DOCUMENTS

| | | | |
|---|---|---|---|
| 4,990,283 A | 2/1991 | Visca et al. | |
| 5,498,680 A | 3/1996 | Abusleme et al. | |
| 6,103,843 A | 8/2000 | Abusleme et al. | |
| 6,680,357 B1 | 1/2004 | Hedhli et al. | |
| 7,122,608 B1 | 10/2006 | Brinati et al. | |
| 2016/0362512 A1* | 12/2016 | Apostolo | ............. C08F 214/18 |

FOREIGN PATENT DOCUMENTS

| | | | | |
|---|---|---|---|---|
| JP | 2000-215917 A | 8/2000 | | |
| WO | 2008129041 A1 | 10/2008 | | |
| WO | WO-2008129041 A1 * | 10/2008 | ............ | B01D 69/02 |
| WO | 2012084578 A1 | 6/2012 | | |
| WO | 2012084579 A1 | 6/2012 | | |
| WO | WO-2012084579 A1 * | 6/2012 | ............ | C08F 214/22 |
| WO | 2013087500 A1 | 6/2013 | | |

* cited by examiner

Primary Examiner — Jessica Whiteley

(57) ABSTRACT

The present invention pertains to a process for the manufacture of a crosslinkable fluoropolymer, to said crosslinkable fluoropolymer and the crosslinked fluoropolymer obtainable therefrom, to a film comprising said crosslinkable fluoropolymer or said crosslinked fluoropolymer and to uses of said crosslinked fluoropolymer film in various applications.

20 Claims, No Drawings

CROSSLINKABLE FLUOROPOLYMERS

This application is a U.S. national stage entry under 35 U.S.C. § 371 of International Application No. PCT/EP2015/053871 filed Feb. 25, 2015, which claims priority to European application No. 14157169.5 filed on Feb. 28, 2014. The entire contents of these applications are explicitly incorporated herein by this reference.

TECHNICAL FIELD

The present invention pertains to a process for the manufacture of a crosslinkable fluoropolymer, to said crosslinkable fluoropolymer and the crosslinked fluoropolymer obtainable therefrom, to a film comprising said crosslinkable fluoropolymer or said crosslinked fluoropolymer and to uses of said crosslinked fluoropolymer film in various applications.

BACKGROUND ART

Vinylidene fluoride (VDF) copolymers comprising recurring units derived from trifluoroethylene (TrFE) have been used extensively in the electronics packaging market due to their ease of processing, chemical inertness and attractive ferroelectric, piezoelectric, pyroelectric and dielectric properties.

As is well known, the term piezoelectric means the ability of a material to exchange electrical for mechanical energy and vice versa and the electromechanical response is believed to be essentially associated with dimensional changes during deformation or pressure oscillation. The piezoelectric effect is reversible in that materials exhibiting the direct piezoelectric effect (the production of electricity when stress is applied) also exhibit the converse piezoelectric effect (the production of stress and/or strain when an electric field is applied).

Ferroelectricity is the property of a material whereby this latter exhibits a spontaneous electric polarization, the direction of which can be switched between equivalent states by the application of an external electric field.

Pyroelectricity is the ability of certain materials to generate an electrical potential upon heating or cooling. Actually, as a result of this change in temperature, positive and negative charges move to opposite ends through migration (i.e. the material becomes polarized) and hence an electrical potential is established.

It is generally understood that piezo-, pyro-, ferro-electricity in copolymers of VDF with TrFE is related to a particular crystalline habit, so called beta-phase, wherein hydrogen and fluorine atoms are arranged to give maximum dipole moment per unit cell.

Copolymers comprising recurring units derived from vinylidene fluoride (VDF) and trifluoroethylene (TrFE) are typically provided as semi-crystalline copolymers which can be shaped or formed into semi-crystalline, essentially unoriented and unstretched, thermoplastic films or sheets or tubular-constructed products via well-known processing methods such as extrusion, injection moulding, compression moulding and solvent casting.

Nevertheless, more recently, developments of thin film electronic devices and/or assemblies of layers of ferroelectric polymers in three-dimensional arrays for increasing e.g. memory density have called for different processing techniques, requiring notably ability of the polymer to be patterned according to lithographic techniques and/or for layers there from to be stacked with annealing treatment on newly formed layer not affecting previously deposited layers.

Within this scenario, crosslinking (elsewhere referred to as "curing"), which is one of the most known techniques in polymer science to stabilize shape and fix structures, has been the technique of choice for accessing these needs.

Solutions have thus been proposed for conferring to VDF-TrFE copolymers cross-linking or curing ability. For instance, WO 2013/087500 (SOLVAY SPECIALTY POLYMERS ITALY S.P.A.) 20 Jun. 2013 discloses semi-crystalline VDF-TrFE fluoropolymers, further comprising recurring units derived from monomers comprising azide groups, which can be easily crosslinked either by thermal treatment or under UV irradiation while retaining inherent piezoelectric, ferroelectric, pyroelectric and dielectric properties.

Also, U.S. Pat. No. 6,680,357 (ATOFINA CHEMICALS INC.) 20 Jan. 2004 discloses acrylic-modified VDF-based fluoropolymers wherein the acrylic phase is capable of entering into crosslinking reactions. Nevertheless, these acrylic-modified VDF-based fluoropolymers are prepared by seed polymerization using the VDF-based fluoropolymer as a seed in the polymerization of one or more (meth)acrylic monomers.

There is thus still a need in the art for VDF-TrFE copolymer materials which can efficiently undergo crosslinking under thermal or UV exposure conditions, yielding uniformly cured materials which still maintain outstanding piezoelectric, ferroelectric, pyroelectric and dielectric properties.

SUMMARY OF INVENTION

It has been now found that by incorporation of (meth)acrylic-containing monomers into fluoropolymers it is possible to successfully manufacture (meth)acrylic-modified fluoropolymers which may be easily crosslinked into fluoropolymer networks advantageously having increased molecular weight.

It has been found that the crosslinked fluoropolymers thereby provided advantageously exhibit both enhanced chemical resistance and enhanced mechanical properties.

In a first instance, the present invention pertains to a process for the manufacture of a crosslinkable fluoropolymer [polymer (FC)], said process comprising reacting:
(A) at least one fluoropolymer [polymer (F)] comprising recurring units derived from vinylidene fluoride (VDF), trifluoroethylene (TrFE) and at least one functional hydrogenated monomer [monomer ($H_F$)] comprising an end group of any of formulae (I) and (II):

—C(O)—O—$R_x$     (I)

—O—$R_x$     (II)

wherein $R_x$ is a hydrogen atom or a $C_1$-$C_5$ hydrocarbon group comprising at least one hydroxyl group, and
(B) at least one (meth)acrylic compound [compound (MA)] of any of formulae (III) to (V):

$R_1R_2C=C(R_3)$—C(O)—O-T     (III)

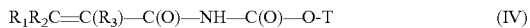

$R_1R_2C=C(R_3)$—C(O)—NH—C(O)—O-T     (IV)

$R_1R_2C=C(R_3)$—Z—C(O)—O-T     (V)

wherein each of $R_1$, $R_2$ and $R_3$, equal to or different from each other, is independently a hydrogen atom or a $C_1$-$C_3$ hydrocarbon group, T is a $C_1$-$C_{10}$ hydrocarbon end group comprising at least one functional group, and Z is a bonding group of any of formulae (j) and (jj):

—NH—X—O—C(O)— (j), and

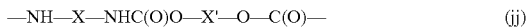
—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic or heteroaromatic groups.

The process for the manufacture of a crosslinkable fluoropolymer [polymer (FC)] according to the invention advantageously comprises reacting the end group(s) of any of formulae (I) and (II) in the monomer(s) ($H_F$) of at least one polymer (F) with the functional group(s) in the end group(s) T of at least one compound (MA) of any of formulae (III) to (V).

In a second instance, the present invention pertains to the crosslinkable fluoropolymer [polymer (FC)] obtainable by the process of the invention.

The crosslinkable fluoropolymer [polymer (FC)] of the invention typically comprises recurring units derived from vinylidene fluoride (VDF), trifluoroethylene (TrFE) and at least one functional hydrogenated monomer [monomer ($H'_F$)] comprising a pendant side chain comprising an end group (E) of any of formulae (III-A) to (V-A):

—O—C(O)—C($R_3$)=$CR_1R_2$ (III-A)

—O—C(O)—NH—C(O)—C($R_3$)=$CR_1R_2$ (IV-A)

—O—C(O)—Z—C($R_3$)=$CR_1R_2$ (V-A)

wherein each of $R_1$, $R_2$ and $R_3$, equal to or different from each other, is independently a hydrogen atom or a $C_1$-$C_3$ hydrocarbon group, and Z is a bonding group of any of formulae (j) and (jj):

—NH—X—O—C(O)— (j), and

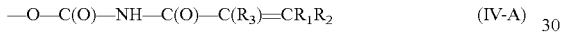
—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic or heteroaromatic groups.

In a third instance, the present invention pertains to a crosslinkable composition [composition (CC)] comprising:
   at least one crosslinkable fluoropolymer [polymer (FC)] and
   at least one additive selected from the group consisting of crosslinking co-agents and crosslinking initiators.

In a fourth instance, the present invention pertains to a process for the manufacture of a crosslinkable fluoropolymer film [film (FC)], said process comprising:
(i) providing a substrate,
(ii) providing a liquid composition [composition (L)] comprising at least one crosslinkable fluoropolymer [polymer (FC)] or the crosslinkable composition [composition (CC)],
(iii) applying the composition (L) provided in step (ii) onto at least one surface of the substrate provided in step (i) thereby providing a coating composition layer, and
(iv) drying the coating composition layer provided in step (iii) thereby providing the crosslinkable fluoropolymer film [film (FC)].

For the purpose of the present invention, the term "film" is intended to denote a flat piece of material having a thickness smaller than either of its length or its width.

For the purpose of the present invention, the term "substrate" is intended to denote either a porous or a non-porous substrate.

By the term "porous substrate" it is hereby intended to denote a substrate layer containing pores of finite dimensions. By the term "non-porous substrate" it is hereby intended to denote a dense substrate layer free from pores of finite dimensions.

The present invention thus also pertains to the crosslinkable fluoropolymer film [film (FC)] obtainable by the process of the invention.

The crosslinkable fluoropolymer film [film (FC)] typically comprises, preferably consists of, at least one crosslinkable fluoropolymer [polymer (FC)] or the crosslinkable composition [composition (CC)].

For the purpose of the present invention, the term "liquid composition [composition (L)]" is intended to denote a composition in the liquid state at 20° C. under atmospheric pressure.

The composition (L) typically comprises at least one organic solvent [solvent (S)].

Non-limitative examples of suitable solvents (S) include, notably, those capable of dissolving the polymer (F).

The solvent (S) is preferably selected from the group consisting of:
   aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF);
   glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;
   glycol ether esters such as ethylene glycol methyl ether acetate, ethylene glycol monoethyl ether acetate, ethylene glycol monobutyl ether acetate, propylene glycol monomethyl ether acetate;
   alcohols such as methyl alcohol, ethyl alcohol, diacetone alcohol;
   ketones such as acetone, methylethylketone, methylisobutyl ketone, diisobutylketone, cyclopentanone, cyclohexanone, isophorone;
   linear or cyclic esters such as isopropyl acetate, n-butyl acetate, methyl acetoacetate, dimethyl phthalate, g-butyrolactone;
   linear or cyclic amides such as N,N-diethylacetamide, N,N-dimethylacetamide, dimethylformamide and N-methyl-2-pyrrolidone; and
   dimethyl sulfoxide.

Under step (iii) of the process of the invention, the composition (L) is applied onto at least one surface of the substrate provided in step (i) typically by using a processing technique selected from the group consisting of casting, spray coating, roll coating, doctor blading, slot die coating, gravure coating, ink jet printing, spin coating, screen printing, brush, squeegee, foam applicator, curtain coating and vacuum coating.

Under step (iv) of the process of the invention, the coating composition layer provided in step (iii) is dried typically at a temperature comprised between 60° C. and 200° C., preferably at a temperature comprised between 100° C. and 180° C.

The crosslinkable fluoropolymer film [film (FC)] may be a patterned crosslinkable fluropolymer film [film (FCp)].

For the purpose of the present invention, the term "patterned crosslinkable fluoropolymer film [film (FCp)]" is intended to denote a crosslinkable fluoropolymer film having whichever pattern geometry.

In a fifth instance, the present invention pertains to a process for the manufacture of a crosslinked fluoropolymer film [film (FCC)], said process comprising:

(i') providing a crosslinkable fluoropolymer film [film (FC)], and (ii') crosslinking the film (FC) provided in step (i').

The present invention thus further pertains to the crosslinked fluoropolymer film [film (FCC)] obtainable by the process of the invention.

The crosslinked fluoropolymer film [film (FCC)] typically comprises, preferably consists of, at least one crosslinked fluoropolymer [polymer (FCC)].

The crosslinked fluoropolymer [polymer (FCC)] is advantageously obtainable by crosslinking of the pendant side chains of the polymer (FC).

The crosslinked fluoropolymer [polymer (FCC)] typically comprises fluoropolymer domains consisting of fluoropolymer chains obtainable by the main chain of the polymer (FC) and hydrocarbon domains consisting of hydrocarbon chains obtainable by crosslinking of the pendant side chains of the polymer (FC).

Determination of the crosslinking density of the crosslinked fluoropolymer film [film (FCC)] of the present invention can be performed by any suitable method. The crosslinked fluoropolymer film [film (FCC)] is typically swelled in a suitable solvent at a specific temperature and either the change in mass or the change in volume is measured. The more the crosslinking density of the crosslinked fluoropolymer film [film (FCC)], the more swelling of the crosslinked fluoropolymer film [film (FCC)] in said solvent.

Should the crosslinkable fluoropolymer film [film (FC)] be a patterned crosslinkable fluoropolymer film [film (FCp)], the crosslinked fluoropolymer film [film (FCC)] obtainable by crosslinking of the same is advantageously also a patterned crosslinked fluoropolymer film [film (FCCp)].

Under step (ii') of the process of the invention, the crosslinkable fluoropolymer film [film (FC)] provided in step (i') is crosslinked typically either by UV treatment under UV radiation or by thermal treatment.

For the purpose of the present invention, the term "UV radiation" is intended to denote electromagnetic radiation with a wavelength shorter than that of visible light but longer than soft X-rays. It can be subdivided into near UV (380-200 nm wavelength; abbreviation: NUV), far or vacuum UV (200-10 nm; abbreviation: FUV or VUV), and extreme UV (1-31 nm; abbreviation: EUV or XUV). NUV having a wavelength of from 200 nm to 380 nm is preferred in the process of the invention. Either monochromatic or polychromatic radiation can be used.

UV radiation can be provided in the crosslinking process of the invention by any suitable UV radiation source. Preferred UV radiation source for the process of the invention is mercury lighting. It is known that a significant portion of the energy radiated from excited mercury vapours is in the ultra-violet part of the spectrum. In the case of the low pressure discharge, more than half of the total energy supplied is radiated in the short-wave UV region at 253.7 nm. High pressure lamps radiate about 10% of their energy in the long-wave UV region at 365.0 nm, but an appreciable amount is also radiated at shorter wavelengths.

Thermal treatment is typically carried out at a temperature comprised between 60° C. and 150° C., preferably between 100° C. and 135° C.

In a sixth instance, the present invention pertains to use of at least one crosslinked fluoropolymer film [film (FCC)] in an electrical or electronic device.

Non-limitative examples of suitable electronic devices include transducers, sensors, actuators, ferroelectric memories and capacitors powdered by electrical devices.

The polymer (F) is typically obtainable by polymerization of vinylidene fluoride (VDF), trifluoroethylene (TrFE) and at least one functional hydrogenated monomer [monomer $(H_F)$] comprising an end group of any of formulae (I) and (II):

wherein $R_x$ is a hydrogen atom or a $C_1$-$C_5$ hydrocarbon group comprising at least one hydroxyl group.

The polymer (F) can be manufactured either by aqueous suspension polymerization or by aqueous emulsion polymerization.

The polymer (F) is preferably manufactured by aqueous emulsion polymerization of vinylidene fluoride (VDF), trifluoroethylene (TrFE), at least one monomer $(H_F)$ as defined above and, optionally, one or more other monomers (F) and/or monomers (H), in the presence of at least one radical initiator, in a polymerization medium comprising:
  water,
  at least one surfactant and
  optionally, at least one non-functional perfluoropolyether oil.

Polymerization pressure ranges typically between 10 bar and 45 bar, preferably between 15 bar and 40 bar, more preferably between 20 bar and 35 bar.

The skilled in the art will choose the polymerization temperature having regards, inter alia, of the radical initiator used. Polymerization temperature is generally selected in the range comprised between 80° C. and 140° C., preferably between 95° C. and 130° C.

Emulsion polymerization process as detailed above have been described in the art (see e.g. U.S. Pat. No. 4,990,283 (AUSIMONT SPA (IT)) 5 Feb. 1991, U.S. Pat. No. 5,498,680 (AUSIMONT SPA) 12 Mar. 1996 and U.S. Pat. No. 6,103,843 (AUSIMONT SPA) 15 Aug. 2000).

The polymer (F) typically comprises one or more chain branches comprising end groups of formulae —$CF_2H$ and/or —$CF_2CH_3$, which usually originate from intra-chain transfer (back-biting) during radical polymerization as shown in the scheme here below:

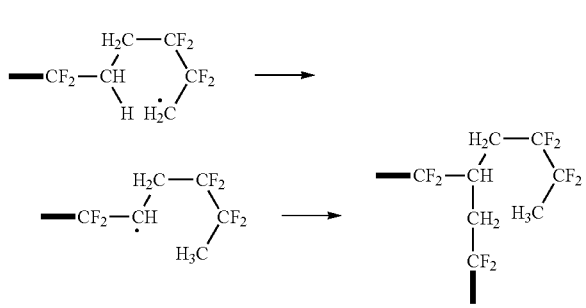

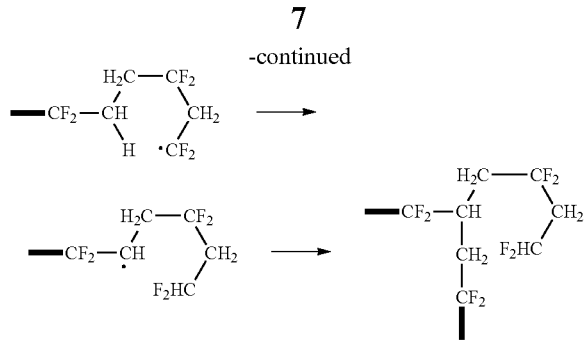

The polymer (F) typically comprises end groups of formula —CF$_2$H and/or —CF$_2$CH$_3$ in an amount of at least 30 mmoles per Kg of VDF recurring units, preferably of at least 40 mmoles per Kg of VDF recurring units, more preferably of at least 50 mmoles per Kg of vinylidene fluoride (VDF) recurring units.

The polymer (F) is advantageously a linear polymer [polymer (F$_L$)] comprising linear sequences of recurring units derived from vinylidene fluoride (VDF), trifluoroethylene (TrFE) and at least one monomer (H$_F$).

The polymer (F) is thus typically distinguishable from graft polymers.

The polymer (F) is advantageously a random polymer [polymer (F$_R$)] comprising linear sequences of randomly distributed recurring units derived from vinylidene fluoride (VDF), trifluoroethylene (TrFE) and at least one monomer (H$_F$).

The Applicant has found that the polymer (F$_R$) advantageously maximizes the effect of the monomer (H$_F$) on the crosslinking ability of the polymer (FC) thereby provided, even at low levels of monomer (H$_F$) in the polymer (F$_R$), without impairing the other outstanding properties of the polymer (F) such as thermal stability and mechanical properties.

The expression "randomly distributed recurring units" is intended to denote the percent ratio between the average number of monomer (H$_F$) sequences (%), said sequences being comprised between two recurring units derived from VDF, and the total average number of recurring units derived from at least one monomer (H$_F$) (%).

When each of the recurring units derived from at least one monomer (H$_F$) is isolated, that is to say that a recurring unit derived from a monomer (H$_F$) is comprised between two recurring units of VDF, the average number of monomer (H$_F$) sequences equals the average total number of recurring units derived from at least one monomer (H$_F$), so that the fraction of randomly distributed recurring units derived from at least one monomer (H F) is 100%: this value corresponds to a perfectly random distribution of recurring units derived from at least one monomer (H$_F$). Thus, the larger is the number of isolated recurring units derived from at least one monomer (H$_F$) with respect to the total number of recurring units derived from at least one monomer (H$_F$), the higher will be the percentage value of fraction of randomly distributed recurring units derived from at least one monomer (H$_F$).

The polymer (F) is thus typically distinguishable from block polymers.

The polymer (F) preferably comprises:
recurring units derived from vinylidene fluoride (VDF), from 10% to 50% by moles, with respect to the total moles of recurring units of said polymer (F), of recurring units derived from trifluoroethylene (TrFE), and
from 0.01% to 10% by moles, with respect to the total moles of recurring units of said polymer (F), of recurring units derived from at least one monomer (H$_F$).

The polymer (F) typically comprises from 15% to 48% by moles, preferably from 16% to 45% by moles, more preferably from 17% to 40% by moles, with respect to the total moles of recurring units of said polymer (F), of recurring units derived from trifluoroethylene (TrFE).

The polymer (F) may further comprise recurring units derived from at least one fluorinated monomer [monomer (F)] different from vinylidene fluoride (VDF) and trifluoroethylene (TrFE).

By the term "fluorinated monomer [monomer (F)]" it is hereby intended to denote an ethylenically unsaturated monomer comprising at least one fluorine atom.

Non-limitative examples of suitable monomers (F) notably include the followings:
(a) C$_2$-C$_8$ perfluoroolefins such as tetrafluoroethylene (TFE) and hexafluoropropylene (HFP);
(b) perfluoroalkylethylenes of formula CH$_2$=CH—R$_{f0}$, wherein R$_{f0}$ is a C$_2$-C$_6$ perfluoroalkyl group;
(c) chloro- and/or bromo- and/or iodo-C$_2$-C$_6$ fluoroolefins such as chlorotrifluoroethylene (CTFE);
(d) perfluoroalkylvinylethers of formula CF$_2$=CFOR$_{f1}$, wherein R$_{f1}$ is a C$_1$-C$_6$ perfluoroalkyl group, such as perfluoromethylvinylether (PMVE) and perfluoropropylvinylether (PPVE);
(e) (per)fluorooxyalkylvinylethers of formula CF$_2$=CFOX$_0$, wherein X$_0$ is a C$_1$-C$_{12}$ oxyalkyl group or a C$_1$-C$_{12}$ (per)fluorooxyalkyl group having one or more ether groups, e.g. perfluoro-2-propoxy-propyl group;
(f) (per)fluoroalkylvinylethers of formula CF$_2$=CFOCF$_2$OR$_{f2}$, wherein R$_{f2}$ is a C$_1$-C$_6$ (per)fluoroalkyl group, e.g. —CF$_3$, —C$_2$F$_5$, —C$_3$F$_7$, or a C$_1$-C$_6$ (per)fluorooxyalkyl group having one or more ether groups, e.g. —C$_2$F$_5$—O—CF$_3$;
(g) functional (per)fluorooxyalkylvinylethers of formula CF$_2$=CFOY$_0$, wherein Y$_0$ is selected from a C$_1$-C$_{12}$ alkyl group or (per)fluoroalkyl group, a C$_1$-C$_{12}$ oxyalkyl group and a C$_1$-C$_{12}$ (per)fluorooxyalkyl group having one or more ether groups, Y$_0$ comprising a carboxylic or sulfonic acid group, in its acid, acid halide or salt form;
(h) fluorodioxoles, preferably perfluorodioxoles such as 2,2,4-trifluoro-5-trifluoromethoxy-1,3-dioxole.

Most preferred monomers (F) are chlorotrifluoroethylene (CTFE), perfluoromethylvinylether (PMVE), tetrafluoroethylene (TFE) and hexafluoropropylene (HFP).

Should at least one monomer (F) be present, the polymer (F) of the invention comprises typically from 2% to 20% by moles, preferably from 3% to 18% by moles, more preferably from 4% to 15% by moles, with respect to the total moles of recurring units of said polymer (F), of recurring units derived from said monomer (F).

The polymer (F) may further comprise recurring units derived from at least one hydrogenated monomer [monomer (H)] different from the monomer (H F).

By the term "hydrogenated monomer [monomer (H)]" it is hereby intended to denote an ethylenically unsaturated monomer comprising at least one hydrogen atom and free from fluorine atoms.

The term "at least one fluorinated monomer [monomer (F)]" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer [monomer (H)]" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) has a heat of fusion typically of from 10 to 90 J/g, preferably of from 30 to 60 J/g, more preferably of from 35 to 55 J/g, as measured according to ASTM D3418.

The melt flow index (MFI) of the polymer (F) of the invention will be selected by the skilled in the art in relation to the processing technology selected for obtaining final parts (e.g. films or sheets).

It is nevertheless generally understood that the polymer (F) will have a MFI as measured according to ASTM D1238 (230° C., 5 Kg) of advantageously at most 500 g/10 min, preferably of at most 200 g/10 min, more preferably of at most 50 g/10 min.

The skilled in the art will select the appropriate concentration of recurring units derived from the monomer ($H_F$) in view of the crosslinking density required in the target field of use of the polymer (FC). It is nevertheless understood that appropriate crosslinking densities are advantageously obtained when the amount of recurring units derived from monomer ($H_F$) is preferably of at least 0.05% by moles, more preferably of at least 0.1% by moles, even more preferably of at least 0.5% by moles, still more preferably of at least 1% by moles, with respect to the total moles of recurring units of polymer (F).

Aiming at not impairing piezo-, pyro-, ferro-electricity behaviour of the polymer (FC), it is also understood that the amount of recurring units derived from monomer ($H_F$) would be preferably of at most 8% by moles, more preferably of at most 7% by moles, even more preferably of at most 5% by moles, still more preferably of at most 3% by moles, with respect to the total moles of recurring units of polymer (F).

The monomer ($H_F$) is advantageously a monomer (H).

The monomer ($H_F$) is typically selected from the group consisting of (meth)acrylic monomers of formula (I-A) and vinyl ether monomers of formula (II-A):

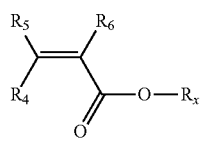

(I-A)

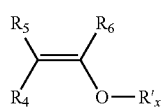

(II-A)

wherein each of $R_4$, $R_5$ and $R_6$, equal to or different from each other, is independently a hydrogen atom or a $C_1$-$C_3$ hydrocarbon group, $R_X$ is a hydrogen atom or a $C_1$-$C_5$ hydrocarbon group comprising at least one hydroxyl group, and $R'_x$ is a $C_1$-$C_5$ hydrocarbon group comprising at least one hydroxyl group.

The monomer ($H_F$) preferably complies with formula (I-A) as defined above.

The monomer ($H_F$) more preferably complies with formula (I-B):

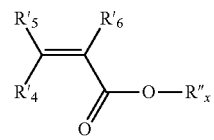

(I-B)

wherein $R'_4$ and $R'_5$ are hydrogen atoms, $R'_6$ is a hydrogen atom or a $C_1$-$C_3$ hydrocarbon group, and $R''_X$ is a hydrogen atom or a $C_1$-$C_5$ hydrocarbon group comprising at least one hydroxyl group.

Non limitative examples of monomers ($H_F$) of formula (I-A) include, notably, acrylic acid, methacrylic acid, hydroxyethyl(meth)acrylate, hydroxypropyl(meth)acrylate, hydroxyethylhexyl(meth)acrylate.

The monomer ($H_F$) is even more preferably selected from the followings:

acrylic acid (AA) of formula:

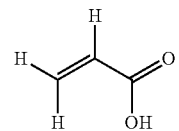

hydroxyethyl acrylate (HEA) of formula:

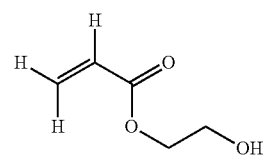

2-hydroxypropyl acrylate (HPA) of either of formulae:

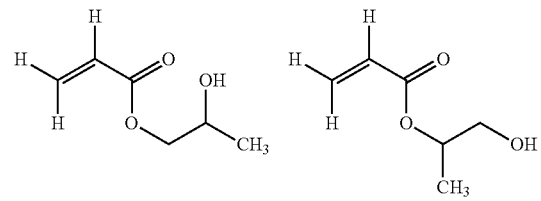

and mixtures thereof.

The (meth)acrylic compound [compound (MA)] is preferably of any of formulae (III') to (V'):

$R'_1R'_2C=C(R'_3)-C(O)-O-T'$ (III')

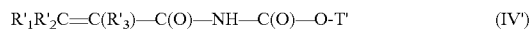

$R'_1R'_2C=C(R'_3)-C(O)-NH-C(O)-O-T'$ (IV')

$R'_1R'_2C=C(R'_3)-Z'-C(O)-O-T'$ (V')

wherein $R'_1$ and $R'_2$ are hydrogen atoms, $R'_3$ is a hydrogen atom or a $C_1$-$C_3$ hydrocarbon group, T' is a $C_1$-$C_{10}$ linear or branched hydrocarbon end group comprising at least one functional group comprising at least one heteroatom selected from the group consisting of oxygen, nitrogen and sulphur, and Z' is a bonding group of any of formulae (j) and (jj):

—NH—X—O—C(O)— (j), and

—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic or heteroaromatic groups.

The functional group in the end group T of the (meth)acrylic compound [compound (MA)] of any of formulae (III) to (V) is typically selected from the group consisting of hydroxyl groups, cyclic alkyl ether groups, isocyanate groups, carboxylic acid groups, amine groups, aryl ether groups and alkoxy silane groups.

The compound (MA) is more preferably selected from the group consisting of 2-hydroxy ethyl (meth)acrylate, 2-hydroxy propyl (meth)acrylate, 2-hydroxy butyl (meth)acrylate, 1-hydroxy butyl (meth)acrylate, glycidyl (meth)acrylate, 2-isocyanatoethyl (meth)acrylate, 2-hydroxy-3-phenyloxy propyl (meth)acrylate, 2-(2-ethoxyethoxy)ethyl (meth)acrylate, 2-phenoxy ethyl (meth)acrylate, phenoxy tetraethyleneglycol (meth)acrylate, (3-methacryloxypropyl)trimethoxy silane, (3-methacryloxypropyl)dimethyl methoxy silane, and (3-acryloxypropyl)-trimethoxy silane.

The process for the manufacture of the crosslinkable fluoropolymer [polymer (FC)] is preferably carried out in a liquid medium comprising at least one organic solvent [solvent (S)].

The process for the manufacture of the crosslinkable fluoropolymer [polymer (FC)] is preferably carried out in the presence of at least one activating agent.

For the purpose of the present invention, the term "activating agent" is intended to denote a compound able to activate the reaction of at least one end group of any of formulae (I) and (II) of the polymer (F) and at least one compound (MA).

According to a first preferred embodiment of the process of the invention, the process comprises reacting at least one polymer (F), wherein the monomer ($H_F$) comprises an end group of formula (I), wherein $R_x$ is a hydrogen atom, and at least one compound (MA) of any of formulae (III) to (V), wherein T is a $C_1$-$C_{10}$ hydrocarbon end group comprising at least one functional group selected from the group consisting of hydroxyl groups, cyclic alkyl ether groups, preferably ethylene oxide groups, and amine groups, preferably primary amine groups.

According to a first variant of this first preferred embodiment of the invention, when the compound (MA) has any of formulae (III) to (V), wherein T is a $C_1$-$C_{10}$ hydrocarbon end group comprising at least one hydroxyl group, the process is typically carried out in the presence of at least one activating agent selected from the group consisting of N,N'-dicyclohexylcarbodiimide, thionyl chloride, oxalyl dichloride and inorganic acids.

According to a second variant of this first preferred embodiment of the invention, when the compound (MA) has any of formulae (III) to (V), wherein T is a $C_1$-$C_{10}$ hydrocarbon end group comprising at least one cyclic alkyl ether group, the process is typically carried out in the presence of at least one activating agent selected from the group consisting of alkyl ammonium halides.

According to a third variant of this first preferred embodiment of the invention, when the compound (MA) has any of formulae (III) to (V), wherein T is a $C_1$-$C_{10}$ hydrocarbon end group comprising at least one amine group, the process is typically carried out in the presence of at least one activating agent selected from the group consisting of thionyl chloride and oxalyl dichloride.

According to a second preferred embodiment of the process of the invention, the process comprises reacting at least one polymer (F), wherein the monomer ($H_F$) comprises an end group of any of formulae (I) and (II), wherein $R_x$ is a $C_1$-$C_5$ hydrocarbon group comprising at least one hydroxyl group, and at least one compound (MA) of any of formulae (III) to (V), wherein T is a $C_1$-$C_{10}$ hydrocarbon end group comprising at least one functional group selected from the group consisting of hydroxyl groups, cyclic alkyl ether groups, preferably ethylene oxide groups, isocyanate groups and carboxylic acid groups.

According to a first variant of this second preferred embodiment of the invention, when the compound (MA) has any of formulae (III) to (V), wherein T is a $C_1$-$C_{10}$ hydrocarbon end group comprising at least one hydroxyl group, the process is typically carried out in the presence of at least one activating agent selected from the group consisting of organic sulfonyl halides.

According to a second variant of this second preferred embodiment of the invention, when the compound (MA) has any of formulae (III) to (V), wherein T is a $C_1$-$C_{10}$ hydrocarbon end group comprising at least one cyclic alkyl ether group, the process is typically carried out in the presence of at least one activating agent selected from the group consisting of alkyl amines, preferably tertiary alkyl amines.

According to a third variant of this second preferred embodiment of the invention, when the compound (MA) has any of formulae (III) to (V), wherein T is a $C_1$-$C_{10}$ hydrocarbon end group comprising at least one isocyanate group, the process is typically carried out in the presence of at least one activating agent selected from the group consisting of organic tin compounds.

According to a fourth variant of this second preferred embodiment of the invention, when the compound (MA) has any of formulae (III) to (V), wherein T is a $C_1$-$C_{10}$ hydrocarbon end group comprising at least one carboxylic acid group, the process is typically carried out in the presence of at least one activating agent selected from the group consisting of inorganic acids.

The crosslinkable fluoropolymer [polymer (FC)] of the invention preferably comprises recurring units derived from vinylidene fluoride (VDF), trifluoroethylene (TrFE) and at least one functional hydrogenated monomer [monomer ($H'_F$)] comprising a pendant side chain of any of formulae (VI) to (X):

—C(O)—O—Y-E (VI)

—C(O)—NH—Y-E (VII)

—[C(O)]$_n$—O—R—O—Y-E (VIII)

—[C(O)]$_n$—O—R—O—C(O)—NH—Y-E (IX)

—[C(O)]$_n$—O—R—O—C(O)—O—Y-E (X)

wherein Y is a $C_1$-$C_{10}$ hydrocarbon bonding group, optionally comprising at least one functional group, R is a $C_1$-$C_5$ hydrocarbon group, optionally comprising at least one hydroxyl group, n is 0 or 1, and E is an end group of any of formulae (III-A) to (V-A):

—O—C(O)—C($R_3$)=$CR_1R_2$ (III-A)

—O—C(O)—NH—C(O)—C($R_3$)=$CR_1R_2$ (IV-A)

—O—C(O)—Z—C($R_3$)=$CR_1R_2$ (V-A)

wherein each of $R_1$, $R_2$ and $R_3$, equal to or different from each other, is independently a hydrogen atom or a $C_1$-$C_3$ hydrocarbon group, and Z is a functional group of any of formulae (j) and (jj):

—NH—X—O—C(O)— (j), and

—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic or heteroaromatic groups.

Non-limitative examples of suitable functional groups in the bonding group Y of the pendant side chain of any of formulae (VI) to (X) of the polymer (FC) include, notably, hydroxyl groups, cyclic alkyl ether groups, isocyanate groups, carboxylic acid groups, amine groups, aryl ether groups and alkoxy silane groups.

The crosslinkable fluoropolymer [polymer (FC)] of the invention more preferably comprises recurring units derived from vinylidene fluoride (VDF), trifluoroethylene (TrFE) and at least one functional hydrogenated monomer [monomer $(H'_F)$] comprising a pendant side chain of any of formulae (VI') to (X'):

—C(O)—O—Y'-E' (VI')

—C(O)—NH—Y'-E' (VII')

—[C(O)]$_{n'}$—O—R'—O—Y'-E' (VIII')

—[C(O)]$_{n'}$—O—R'—O—C(O)—NH—Y'-E' (IX')

—[C(O)]$_{n'}$—O—R'—O—C(O)—O—Y'-E' (X')

wherein Y' is a $C_1$-$C_{10}$ linear or branched hydrocarbon bonding group, optionally comprising at least one functional group, R' is a $C_1$-$C_5$ hydrocarbon group, optionally comprising at least one hydroxyl group, n' is 0 or 1, and E' is an end group of any of formulae (III'-A) to (V'-A):

—O—C(O)—C(R'$_3$)=CR'$_1$R'$_2$ (III'-A)

—O—C(O)—NH—C(O)—C(R'$_3$)=CR'$_1$R$_2$ (IV'-A)

—O—C(O)—Z'—C(R'$_3$)=CR'$_1$R$_2$ (V'-A)

wherein R'$_1$ and R'$_2$ are hydrogen atoms, R'$_3$ is a hydrogen atom or a $C_1$-$C_3$ hydrocarbon group, and Z' is a bonding group of any of formulae (j) and (jj):

—NH—X—O—C(O)— (j), and

—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic or heteroaromatic groups.

The crosslinkable fluoropolymer [polymer (FC)] of the invention even more preferably comprises:

recurring units derived from vinylidene fluoride (VDF), from 10% to 50% by moles, with respect to the total moles of recurring units of said polymer (FC), of recurring units derived from trifluoroethylene (TrFE), and from 0.01% to 10% by moles, with respect to the total moles of recurring units of said polymer (FC), of recurring units derived from at least one monomer $(H'_F)$.

The polymer (FC) typically comprises from 15% to 48% by moles, preferably from 16% to 45% by moles, more preferably from 17% to 40% by moles, with respect to the total moles of recurring units of said polymer (FC), of recurring units derived from trifluoroethylene (TrFE).

The polymer (FC) comprises recurring units derived from at least one monomer $(H'_F)$ in an amount preferably of at least 0.05% by moles, more preferably of at least 0.1% by moles, even more preferably of at least 0.5% by moles, still more preferably of at least 1% by moles, with respect to the total moles of recurring units of said polymer (FC).

The polymer (FC) comprises recurring units derived from at least one monomer $(H'_F)$ in an amount preferably of at most 8% by moles, more preferably of at most 7% by moles, even more preferably of at most 5% by moles, still more preferably of at most 3% by moles, with respect to the total moles of recurring units of said polymer (FC).

The polymer (FC) may further comprise recurring units derived from at least one fluorinated monomer [monomer (F)] different from vinylidene fluoride (VDF) and trifluoroethylene (TrFE).

Should at least one monomer (F) be present, the polymer (FC) of the invention comprises typically from 2% to 20% by moles, preferably from 3% to 18% by moles, more preferably from 4% to 15% by moles, with respect to the total moles of recurring units of said polymer (FC), of recurring units derived from said monomer (F).

The polymer (FC) may further comprise recurring units derived from at least one hydrogenated monomer [monomer (H)] different from the monomer $(H'_F)$.

The polymer (FC) obtainable by the process of the invention is typically recovered and then dried.

Drying can be performed under modified atmosphere, e.g. under an inert gas, typically exempt notably from moisture (water vapour content of less than 0.001% v/v), or can be performed under vacuum.

Drying can be performed at room temperature (about 25° C.) or at a temperature exceeding 25° C., this latter condition being generally preferred.

It is understood that, under drying conditions, the low molecular weight side products generated by reaction of at least one polymer (F) and at least one compound (MA), which can be notably water or alcohols as a function of the nature of the compound (MA), are at least partially removed from the polymer (FC), possibly further promoting, by combined action of heat and side products removal, additional reaction of said at least one polymer (F) and said at least one compound (MA).

The skilled in the art will select the drying temperature having regards, inter alia, of not causing the polymer (FC) to crosslink.

While the polymer (FC) may advantageously undergo self-crosslinking, that is to say that it can be cured in the absence of any additional crosslinking co-agent and/or crosslinking initiator, it is generally preferred to use a crosslinkable composition [composition (CC)] comprising:

at least one crosslinkable fluoropolymer [polymer (FC)] and at least one additive selected from the group consisting of crosslinking co-agents and crosslinking initiators.

The crosslinking co-agent is typically a poly(meth)acrylic compound [compound (PMA)] comprising at least two end groups of formula (XI):

—O—C(O)—C(R$_7$)=CR$_8$R$_9$ (XI)

wherein each of $R_7$, $R_8$ and $R_9$, equal to or different from each other, is independently a hydrogen atom or a $C_1$-$C_3$ hydrocarbon groups.

The compound (PMA) preferably comprises at most six end groups of formula (XI) as defined above.

The compound (PMA) is more preferably selected from the group consisting of ethylene glycol di(meth)acrylate, diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, 1,3-butylene glycol di(meth)acrylate, tri propylene glycol di(meth)acrylate, ethoxylated bisphenol A di(meth)acrylate, cyclohexane dimethanol di(meth)acrylate, tris[2-(acryloyloxy)ethyl]isocyanurate, trimethylol propane triacrylate, ethylene oxide added trimethylol propane triacrylate, pentaerythritol triacrylate, tris(acrylooxyethyl) isocyanurate, dipentaerythritol hexaacrylate and caprolactone denatured dipentaerythritol hexaacrylate.

The crosslinking initiator may be a photoinitiator [initiator (PI)] or a thermal initiator [initiator (TI)].

The dose of the UV radiation will be adjusted by the skilled in the art as a function of the type and concentration of the photoinitiator [initiator (PI)]; generally, good results have been obtained with radiation doses of at least 2 J/cm², preferably of at least 5 J/cm².

For achieving improved curing rates and minimizing degradation reactions, the crosslinkable fluoropolymer film [film (FC)] may be submitted to a UV radiation under a substantially oxygen-free atmosphere. Typically, step (ii') of the process of the invention is carried out under nitrogen atmosphere.

The photoinitiator [initiator (PI)] is typically selected from the group consisting of alpha-hydroxyketones, phenylglyoxylates, benzyldimethyl ketals, alpha-aminoketones and bis acyl phosphines.

Among alpha-hydroxyketones, mention can be made of 1-hydroxy-cyclohexyl-phenyl-ketone, 2-hydroxy-2-methyl-1-phenyl-1-propanone and 2-hydroxy-1-[4-(2-hydroxyethoxy)phenyl]-2-methyl-1-propanone.

Among phenylglyoxylates, mention can be made of methylbenzoylformate, oxy-phenyl-acetic acid 2-[2-oxo-2-phenyl-acetoxy-ethoxy]-ethyl ester and oxy-phenyl-acetic 2-[2-hydroxy-ethoxy]-ethyl ester.

Among benzyldimethyl ketals, mention can be made of alpha, alpha-dimethoxy-alpha-phenylacetophenone.

Among alpha-aminoketones, mention can be made of 2-benzyl-2-(dimethylamino)-1-[4-(4-morpholinyl)phenyl]-1-butanone and 2-methyl-1-[4-(methylthio)phenyl]-2-(4-morpholinyl)-1-propanone.

Among bis acyl phosphines, mention can be made of diphenyl-(2,4,6-trimethylbenzoyl)-phosphine oxide.

Among initiators (PI), those which are liquid at room temperature are preferred.

A class of initiators (PI) which gave particularly good results has been that of alpha-hydroxyketones, in particular 2-hydroxy-2-methyl-1-phenyl-1-propanone.

The amount of initiator (PI) in the composition (CC) is not particularly limited. It will be generally used in an amount comprised between 0.01% and 10% by weight, with respect to the total weight of the composition (CC). According to an embodiment of the invention, the composition (CC) comprises at least one initiator (PI) in an amount comprised between 3% and 7% by weight, with respect to the total weight of the composition (CC).

The thermal initiator [initiator (TI)] is typically selected from the group consisting of organic peroxides.

The composition (CC) might possibly comprise further additives and ingredients, provided that they do not interfere with light transmission.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not (imitative of the scope of the invention.

Determination of Total Average Monomer ($H_F$) Content

Total average monomer ($H_F$) content in polymers (F) was determined by acid-base titration. A sample of 1.0 g of fluoropolymer was dissolved in acetone at a temperature of about 70° C. 5 ml of water was added thereto drop wise under vigorous stirring so as to avoid coagulation of the polymer. Titration with aqueous NaOH having a concentration of 0.01 N until complete neutralization of acidity was then carried out, with neutrality transition at about −170 mV.

Raw Materials

Polymer (F-1): VDF-TrFE-CTFE-AA polymer (6.08% by moles of AA with respect to the total moles of VDF (63% by moles), TrFE (28% by moles) and CTFE (9% by moles)).

Polymer (F-2): VDF-TrFE-HEA (1% by moles of HEA with respect to the total moles of VDF (75% by moles) and TrFE (25% by moles)).

Polymer (F-3): VDF-TrFE-CTFE-AA polymer (3% by moles of AA with respect to the total moles of VDF (63% by moles), TrFE (28% by moles) and CTFE (9% by moles)).

PREPARATIVE EXAMPLE 1

Synthesis of a VDF-TrFE-CTFE-AA Polymer [Polymer (F-1)]

In an AISI 316 steel vertical autoclave equipped with baffles and stirrer, working at 570 rpm, 3.5 lt. of demineralized water was introduced. The temperature was then brought to reaction temperature of 120° C. When this temperature was reached, 32.5 g of a microemulsion prepared according to Example 1 of U.S. Pat. No. 7,122,608 (SOLVAY SOLEXIS S.P.A.) 17 Oct. 2006, 5 bar of vinilidene fluoride and 0.5 bar of chlorotrifluoroethylene were introduced. A gaseous mixture of VDF-TrFE-CTFE in a molar nominal ratio of 63/28/9 was fed until reaching a pressure of 30 bar.

The composition of the gaseous mixture present in the autoclave head was analyzed by G.C. The gaseous phase was found to be formed of the following compounds in the following molar percentages: 74% VDF, 21% TrFE, 5% CTFE. Then, by a metering pump, 20 ml of di-tert butyl peroxide (DTBP), 2 ml of a 35% by volume aqueous solution of acrylic acid and 15 ml of a 2% by weight aqueous solution of ammonium peroxidisulphate (APS) were fed.

The polymerization pressure was maintained constant by feeding the above mentioned monomeric mixture; when 3% of the mixture had been fed, the temperature was lowered to 105° C., 2 ml of the aqueous solution of acrylic acid and 15 ml of the APS solution were fed every 15 g of polymer synthesized. When 300 g of the mixture had been fed, the reaction temperature was kept constant and the pressure was let fall down up to 15 bar. The reactor was then cooled to room temperature, the latex was unloaded and coagulated by freezing for 48 hours. The polymer was finally washed with demineralized water and dried at 80° C. for 48 hours.

Characterization of the obtained polymer:
MW: 291000 Dalton
Second melting temperature ($T_{m2}$): 118.6° C.
Curie temperature ($T_{Curie}$): 20.9° C.
The amount of acrylic acid in the final polymer was found to be 6.08% by moles.

PREPARATIVE EXAMPLE 2

Synthesis of a VDF-TrFE-HEA Polymer [Polymer (F-2)]

In an AISI 316 steel vertical autoclave equipped with baffles and stirrer, working at 570 rpm, 3.5 lt. of demineralized water was introduced. The temperature was then brought to reaction temperature of 120° C. When this temperature was reached, 32.5 g of a microemulsion prepared according to Example 1 of U.S. Pat. No. 7,122,608 (SOLVAY SOLEXIS S.P.A.) 17 Oct. 2006 and 7.3 bar of vinilidene fluoride was introduced. A gaseous mixture of VDF-TrFE in a molar nominal ratio of 75/25 was fed until reaching a pressure of 30 bar.

The composition of the gaseous mixture present in the autoclave head was analyzed by G.C. The gaseous phase was found to be formed of the following compounds in the following molar percentages: 82% VDF, 18% TrFE. Then, by a metering pump, 25 ml of di-tert butyl peroxide (DTBP) and 15 ml of a 15% by volume aqueous solution of 2-hydroxy ethyl acrylate were fed.

The polymerization pressure was maintained constant by feeding the above mentioned monomeric mixture; when 3% of the mixture had been fed, the temperature was lowered to 105° C. and 15 ml of the aqueous solution of 2-hydroxy ethyl acrylate was fed every 15 g of polymer synthesized. When 575 g of the mixture had been fed, the reaction temperature was kept constant and the pressure was let fall down up to 15 bar. The reactor was then cooled to room temperature, the latex was unloaded and coagulated by freezing for 48 hours. The polymer was finally washed with demineralized water and dried at 80° C. for 48 hours.
Characterization of the obtained polymer:
MW: 264000 Dalton
Second melting temperature ($T_{m2}$): 141.6° C.
Curie temperature ($T_{Curie}$): 113.4° C.
The amount of 2-hydroxyl ethyl acrylate in the final polymer was found to be 1% by moles.

EXAMPLE 1

Manufacture of a Crosslinkable Fluoropolymer [Polymer (FC-1)]

In a 250 ml 4-necked glass reaction flask, equipped with a magnetic stirrer, a condenser, a thermometer and a dripping funnel, 9.36 g (44.55 mmols) of N,N'-dicyclohexylcarbodiimide (DCCD) and 5.74 g (44.55 mmols) of hydroxy propyl acrylate isomers were dissolved in 10 ml of ethyl acetate at 3° C. with vigorous stirring. Once a homogeneous mixture was obtained, a homogeneous mixture of 22.9 g (17.82 meq) of the polymer prepared according to Preparative Example 1, containing 6.08% by moles of acrylic acid (EW=1286 g/eq), dissolved in 200 ml of ethyl acetate, was dripped thereto at 3° C. in 80 minutes. The glass reactor was shielded from direct light by covering it with an aluminium foil. Finally, a mixture of 0.43 g (3.56 mmols) of N,N-dimethylaminopyridine dissolved in 20 ml of ethyl acetate was dripped thereto in about 10 minutes at 3° C. The homogeneous mixture so obtained was kept at 3° C. with stirring for additional 60 minutes and then heated to 20° C. and kept under an inert atmosphere ($N_2$) in the dark for 24 hours. The crude reaction mixture was then centrifuged at 3000 rpm for 30 minutes at 10° C. so as to let dicyclohexyl urea (DCU) precipitate. The crude acrylate-modified polymer was precipitated by pouring the crude mother liquor in $H_2O$ and filtering it using a Buchner funnel. The polymer was then washed with a total of 3 lt. of distilled $H_2O$. The wet modified polymer was then dissolved in 600 ml of ethyl acetate, dried over $MgSO_4$ and filtered using a pressure filter. The anhydrous polymer was finally dried in a vacuum oven at 50° C. and 10 mm Hg of residual pressure.

Conversion (of starting acrylate co-monomer): 13.8% by moles based on the recovered DCU.
Amount of hydroxyl propyl acrylate incorporated: 2.04% by weight corresponding to 11 acrylate sites/100000 g/mole.
EW: 8970 g/eq.
Isolated yield: 100%.

EXAMPLE 2

Manufacture of a Crosslinkable Fluoropolymer [Polymer (FC-2)]

In a 250 ml 4-necked glass reaction flask, equipped with a magnetic stirrer, a condenser, a thermometer and a dripping funnel, 15.0 g (11.66 meq) of the polymer prepared according to Preparative Example 1, containing 6.08% by moles of acrylic acid (EW=1286 g/eq), were completely dissolved in 130 ml of ethyl acetate. The reactor was placed in an inert atmosphere ($N_2$) under vigorous stirring and heated to 55° C. The reactor was then cooled to 20° C. and a mixture of thionyl chloride (13.86 g, 116.6 mmols) and pyridine (0.92 g, 11.66 mmols) was dripped thereto in 60 minutes. The mixture was then heated to 75° C. with vigorous stirring for 3 hours and the volume of HCl gas evolved was measured. Once the conversion was completed, the crude mixture so obtained was filtered so as to remove side-products and then evaporated in a rotary evaporator at 70° C. and 100 mm Hg residual pressure. The evaporated solid was dissolved in 100 ml of ethyl acetate and submitted to three dissolution/evaporation cycles thus ensuring complete removal of excess thionyl chloride. The product was dissolved in 70 ml of ethyl acetate and heated to 75° C. with vigorous stirring under an inert ($N_2$) atmosphere. A mixture of hydroxy propyl acrylate isomers (15.17 g, 116.6 mmol) dissolved in 30 ml of ethyl acetate was dripped thereto. Once HCl evolution stopped, the crude mixture was stirred at 75° C. for additional 5 hours. The crude polymer mixture was then evaporated at 70° C. and 18 mm Hg of residual pressure. The solid polymer obtained was finally washed with ethyl acetate and $CH_2Cl_2$ and dried in a vacuum oven at 65° C. for 4 hrs.

Conversion (of starting acrylate co-monomer): 11% by moles.
Isolated yield: 83.6%
EW: 11217 g/eq=1.63% w/w of acrylate=9 acrylate sites/100000 g/mol.

EXAMPLE 3

Manufacture of a Crosslinkable Fluoropolymer [Polymer (FC-3)]

The polymer (FC-3) was manufactured by reacting the polymer prepared according to Preparative Example 1 with glycidyl methacrylate at 85°-95° C. in dimethylacetamide/acetonitrile solvent mixture in the presence of tetrabutyl ammonium bromide.
Conversion of —COOH groups: 10% by moles corresponding to 8 acrylate sites/100000 g/mole.
Isolated yield: 35% by moles.

EXAMPLE 4

Manufacture of a Crosslinkable Fluoropolymer [Polymer (FC-4)]

The polymer (FC-4) was manufactured by reacting the polymer prepared according to Preparative Example 1 with hydroxyl propyl acrylate isomers in the presence of a catalytic amount of $H_2SO_4$ at 85° C.-100° C. in dimethylacetamide/toluene solvent mixture.
Conversion of —COOH groups: 14.5% by moles corresponding to 12 acrylate sites/100000 g/mole.
Isolated yield: 34%.

EXAMPLE 5

Manufacture of a Crosslinkable Fluoropolymer [Polymer (FC-5)]

In a 2000 ml 4-necked glass reaction flask, equipped with a magnetic stirrer, a condenser, a thermometer and a dripping funnel, 220 g (171 meq) of the polymer prepared according to Preparative Example 1, containing 6.08% by moles of acrylic acid (EW=1286 g/eq), were completely dissolved in 1375 ml of ethyl acetate. The reactor was placed in an inert atmosphere ($N_2$) under vigorous stirring and heated to 50° C. A mixture of oxalyl dichloride (109 g, 856 mmols) dissolved in 330 ml of ethyl acetate was dripped thereto in 60 minutes. The volume of HCl, CO and $CO_2$ gases evolved was measured. Once gas evolution stopped, the mixture was heated to 50° C. with vigorous stirring for additional 3 hours. Once the conversion was completed, the crude mixture so obtained was filtered so as to remove side-products and then evaporated in a rotary evaporator at 55° C. and 180 mm Hg residual pressure. The evaporated solid was dissolved in 500 ml of ethyl acetate and submitted to two dissolution/evaporation cycles thus ensuring complete removal of excess oxalyl dichloride. The product was dissolved in 1000 ml of ethyl acetate and heated to 75° C. with vigorous stirring under an inert ($N_2$) atmosphere. A mixture of hydroxy propyl acrylate isomers (128 g, 986 mmol) dissolved in 330 ml of ethyl acetate was dripped thereto in about 60 minutes. Once HCl evolution stopped, the crude mixture was stirred at 75° C. for additional 5 hours. The crude polymer mixture was then poured into a 10 lt. flask containing 5 lt. of distilled $H_2O$ and washed with additional 2 lt. of distilled $H_2O$. The solid polymer obtained was finally dried in a vacuum oven at 65° C. for 4 hrs.
Conversion (of starting acrylate co-monomer): 27% by moles.
Isolated yield: 84%
EW: 4426 g/eq=4.16% w/w of acrylate=22 acrylate sites/100000 g/mol.

EXAMPLE 6

Manufacture of a Crosslinkable Fluoropolymer [Polymer (FC-6)]

The polymer (FC-6) was manufactured by following the same procedure as detailed under Example 5 but using the polymer (F-3).
Conversion (of starting acrylate co-monomer): 33% by moles.
Isolated yield: 96%
EW: 9097 g/eq=2.02% w/w of acrylate=11 acrylate sites/100000 g/mol.

COMPARATIVE EXAMPLE 1

The polymer prepared according to Preparative Example 2, containing 1% by moles of 2-hydroxy ethyl acrylate (EW=7495 g/eq) (1 g, 0.133 meq) was dissolved in 20 ml of ethyl acetate at 20° C. The mixture was placed in a Petri dish to which 50 ml of a 10% v/v solution of methylene-4-4'biscyclohexylisocyanate (0.02 mmol, 0.04 meq —NCO) and 10 ml of a 2% solution of di-tert-butyl tin bislaurate as catalyst were added. The mixture so obtained was heated in an oven at 55° C. for 3 hours at atmospheric pressure. Following the thermal reaction, the solvent was evaporated and a film made from a crosslinked polymer with covalent urethane bonds was recovered from the Petri dish by adding 10 ml of distilled $H_2O$. The wet film was dried in a vacuum oven at 50° C. and 10 mm Hg residual pressure. The film thereby provided was not soluble in ethyl acetate and other solvents such as acetone in which the polymers prepared according to Preparative Example 1 and Preparative Example 2 were soluble, thus confirming that the polymer forming the film is suitably crosslinked.

A) Manufacture of films and crosslinking thereof using polymers (FC-1), (FC-2), (FC-3), (FC-4), (FC-5) and (FC-6) of Examples 1 to 6

Specimens of any of the polymers obtained according to Examples 1 to 6 were dissolved in a mixture containing triethyl phosphate, propylene glycol monomethyl ether acetate and cyclopentanone so as to provide, after 3 hours of stirring at a temperature of 40° C., clear solutions having a concentration of 10% by weight for spin coating and of 0.9% by weight for ink jet printing.

B) Spin Coating (SC)

The solutions so obtained were loaded into a Laurell WS-650 LITE SERIES spin coater and spin-coated at a speed of 2000 rpm onto silicon wafer substrates in order to obtain very thin polymeric layers on silicon wafer as substrate. The polymer layers so obtained were dried at 85° C. for 20 minutes. For each example, two polymeric films on silicon wafer were prepared.

The samples thereby obtained were all homogeneous and completely optically transparent. The thickness of the samples has been measured using a Filmetrics F20 unit.

C) Ink Jet Printing (IJ)

The solutions so obtained were loaded into a Dimatix DMP 2831 inkjet printer having a cartridge suitable for solvents and printed onto glass, silicon wafers and on ITO covered glass in order to obtain very thin polymeric layers on these substrates. The polymer layers so obtained were dried at 85° C. for 10 minutes. For each example, two polymeric films on glass were prepared.

The samples thereby obtained were all homogeneous and completely optically transparent. The thickness of the samples has been measured using a Filmetrics F20 unit.

D) Crosslinking:

The polymer films obtained either by spin coating or by ink jet printing as detailed above were submitted to crosslinking either by UV treatment or by thermal treatment.

Thermal treatment consisted in maintaining samples of films so obtained in a ventilated oven at a temperature of about 125° C. for 20 minutes. For UV treatment, samples of films obtained according to procedure A) but using a composition comprising any of the polymers obtained according to Examples 1 to 6 and at least one additive selected from the group consisting of crosslinking co-agents and crosslinking initiators were passed through a semi-automatic crosslinker device based on a UV lamp having a power of 13 mW/cm² and equipped with a moving belt carrying the samples for 30 seconds equivalent to 3 steps of 10 seconds each. The crosslinking co-agent was selected from the group consisting of poly(meth)acrylic compounds (PMA).

The crosslinking initiator was selected from the group consisting of photoinitiators (PI).

E) Chemical Resistance Test:

In order to verify if the samples were crosslinked, pure acetone was poured on the films after crosslinking treatment: insolubility in such conditions was considered to be a clear evidence of suitable crosslinking.

Results are summarized in Table 1 here below.

TABLE 1

| Film | Film thickness | Solubility in acetone before treatment | UV treatment | Thermal treatment |
|---|---|---|---|---|
| Ex. 1 | SC: 550 nm<br>IJ: 46 nm | soluble | partially soluble | partially soluble |
| Ex. 1 + PMA | SC: 630 nm<br>IJ: 49 nm | soluble | insoluble | insoluble |
| Ex. 1 + PI | SC: 600 nm<br>IJ: 47 nm | soluble | insoluble | insoluble |
| Ex. 2 | SC: 580 nm<br>IJ: 50 nm | soluble | partially soluble | partially soluble |
| Ex. 2 + PMA | SC: 600 nm<br>IJ: 53 nm | soluble | insoluble | insoluble |
| Ex. 2 + PI | SC: 590 nm<br>IJ: 52 nm | soluble | insoluble | insoluble |
| Ex. 3 | SC: 480 nm<br>IJ: 49 nm | soluble | partially soluble | partially soluble |
| Ex. 3 + PMA | SC: 500 nm<br>IJ: 51 nm | soluble | insoluble | insoluble |
| Ex. 3 + PI | SC: 530 nm<br>IJ: 50 nm | soluble | insoluble | insoluble |
| Ex. 4 | SC: 540 nm<br>IJ: 56 nm | soluble | partially soluble | partially soluble |
| Ex. 4 + PMA | SC: 590 nm<br>IJ: 59 nm | soluble | insoluble | insoluble |
| Ex. 4 + PI | SC: 610 nm<br>IJ: 58 nm | soluble | insoluble | insoluble |
| Ex. 5 | SC: 690 nm<br>IJ: 61 nm | soluble | partially soluble | partially soluble |
| Ex. 5 + PMA | SC: 640 nm<br>IJ: 57 nm | soluble | insoluble | insoluble |
| Ex. 5 + PI | SC: 660 nm<br>IJ: 58 nm | soluble | insoluble | insoluble |
| Ex. 6 | SC: 670 nm<br>IJ: 58 nm | soluble | partially soluble | partially soluble |
| Ex. 6 + PMA | SC: 620 nm<br>IJ: 57 nm | soluble | insoluble | insoluble |
| Ex. 6 + PI | SC: 630 nm<br>IJ: 57 nm | soluble | insoluble | insoluble |
| Polymer (F-1) | SC: 520 nm<br>IJ: 49 nm | soluble | soluble | soluble |
| Polymer (F-2) | SC: 540 nm<br>IJ: 45 nm | soluble | soluble | soluble |
| Polymer (F-3) | SC: 730 nm<br>IJ: 62 nm | soluble | soluble | soluble |

Results in Table 1 here above well demonstrate that polymers (FC) according to the invention such as those obtained according to Examples 1 to 6 are effective in crosslinking either by UV treatment or by thermal treatment to the same extent as crosslinked polymers obtained according to Comparative Example 1. On the contrary, the polymer (F-1), the polymer (F-2) and the polymer (F-3), said polymers being free from (meth)acrylic end groups, do not undergo crosslinking.

The invention claimed is:

1. A crosslinkable fluoropolymer [polymer (FC)] comprising:
   first recurring units derived from vinylidene fluoride (VDF),
   from 10% to 50% by moles, with respect to the total moles of recurring units of said polymer (FC), of second recurring units derived from trifluoroethylene (TrFE), and
   from 0.01% to 10% by moles, with respect to the total moles of recurring units of said polymer (FC), of third recurring units derived from at least one functional hydrogenated monomer (H'F), said third recurring units comprising a pendant side chain comprising an end group (E) of any of formulae (III-A) to (V-A):

$$-O-C(O)-C(R_3)=CR_1R_2 \qquad (III\text{-}A)$$

$$-O-C(O)-NH-C(O)-C(R_3)=CR_1R_2 \qquad (IV\text{-}A)$$

$$-O-C(O)-Z-C(R_3)=CR_1R_2 \qquad (V\text{-}A)$$

wherein each of $R_1$, $R_2$ and $R_3$, equal to or different from each other, is independently a hydrogen atom or a $C_1$-$C_3$ hydrocarbon group, and Z is a bonding group of any of formulae (j) and (jj):

$$-NH-X-O-C(O)- \qquad (j), \text{ and}$$

$$-NH-X-NHC(O)O-X'-O-C(O)- \qquad (jj)$$

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic and heteroaromatic groups.

2. The crosslinkable fluoropolymer [polymer (FC)] according to claim 1, wherein the pendent side chain of at least one monomer (H'F) is a pendant side chain of any of formulae (VI) to (X):

$$-C(O)-O-Y-E \qquad (VI)$$

$$-C(O)-NH-Y-E \qquad (VII)$$

$$-[C(O)]_n-O-R-O-Y-E \qquad (VIII)$$

$$-[C(O)]_n-O-R-O-C(O)-NH-Y-E \qquad (IX)$$

$$-[C(O)]_n-O-R-O-C(O)-O-Y-E \qquad (X)$$

wherein Y is a $C_1$-$C_{10}$ hydrocarbon bonding group, optionally comprising at least one functional group, R is a $C_1$-$C_5$ hydrocarbon group, optionally comprising at least one hydroxyl group, n is 0 or 1, and E is an end group of any of formulae (III-A) to (V-A).

3. A process for the manufacture of the crosslinkable fluoropolymer [polymer (FC)] according to claim 1, said process comprising reacting:
   (A) at least one fluoropolymer [polymer (F)] comprising:
      first recurring units derived from vinylidene fluoride (VDF),
      from 10% to 50% by moles, with respect to the total moles of recurring units of said polymer (F), of second recurring units derived from trifluoroethylene (TrFE), and
      from 0.01% to 10% by moles, with respect to the total moles of recurring units of said polymer (F), of third recurring units derived from at least one functional hydrogenated monomer (H$_F$), said third recurring units comprising a pendant side chain comprising an end group of any of formulae (I) and (II):

—C(O)—O—$R_x$ (I)

—O—$R_x$ (II)

wherein $R_x$ is a hydrogen atom or a $C_1$-$C_5$ hydrocarbon moiety comprising at least one hydroxyl group, and (B) at least one (meth)acrylic compound (MA) of any of formulae (III) to (V):

$R_1R_2C=C(R_3)$—C(O)—O-T (III)

$R_1R_2C=C(R_3)$—C(O)—NH—C(O)—O-T (IV)

$R_1R_2C=C(R_3)$—Z—C(O)—O-T (V)

wherein each of $R_1$, $R_2$ and $R_3$, equal to or different from each other, is independently a hydrogen atom or a $C_1$-$C_3$ hydrocarbon group, T is a $C_1$-$C_{10}$ hydrocarbon end group comprising at least one functional group, and Z is a bonding group of any of formulae (j) and (jj):

—NH—X—O—C(O)— (j), and

—NH—X—NHC(O)O—X'—O—C(O)— (jj)

wherein X and X', equal to or different from each other, are independently hydrocarbon groups selected from the group consisting of $C_1$-$C_{20}$ aliphatic groups, $C_5$-$C_{40}$ cycloaliphatic groups and $C_6$-$C_{50}$ aromatic, alkylaromatic and heteroaromatic groups.

4. The process according to claim 3, wherein monomer ($H_F$) is selected from the group consisting of (meth)acrylic monomers of formula (I-A) and vinyl ether monomers of formula (II-A):

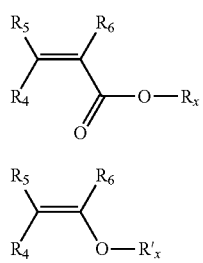

(I-A)

(II-A)

wherein each of $R_4$, $R_5$ and $R_6$, equal to or different from each other, is independently a hydrogen atom or a $C_1$-$C_3$ hydrocarbon group, $R_X$ is a hydrogen atom or a $C_1$-$C_5$ hydrocarbon moiety comprising at least one hydroxyl group, and $R'_x$ is a $C_1$-$C_5$ hydrocarbon moiety comprising at least one hydroxyl group.

5. The process according to claim 3, wherein T is a C1-C10 hydrocarbon end group comprising at least one functional group selected from the group consisting of hydroxyl groups, cyclic alkyl ether groups, isocyanate groups, carboxylic acid groups, amine groups, aryl ether groups and alkoxy silane groups.

6. The process according to claim 3, said process being carried out in a liquid medium comprising at least one organic solvent (S).

7. The process according to claim 3, wherein monomer ($H_F$) comprises an end group of formula (I), wherein $R_x$ is a hydrogen atom, and compound (MA) has any of formulae (III) to (V), wherein T is a $C_1$-$C_{10}$ hydrocarbon end group comprising at least one hydroxyl group, said process being carried out in the presence of at least one activating agent selected from the group consisting of N,N'-dicyclohexylcarbodiimide, thionyl chloride, oxalyl dichloride and inorganic acids.

8. The process according to claim 3, wherein monomer ($H_F$) comprises an end group of formula (I), wherein $R_x$ is a hydrogen atom, and compound (MA) has any of formulae (III) to (V), wherein T is a $C_1$-$C_{10}$ hydrocarbon end group comprising at least one cyclic alkyl ether group, said process being carried out in the presence of at least one activating agent selected from the group consisting of alkyl ammonium halides.

9. The process according to claim 3, wherein monomer ($H_F$) comprises an end group of formula (I), wherein $R_x$ is a hydrogen atom, and compound (MA) has any of formulae (III) to (V), wherein T is a $C_1$-$C_{10}$ hydrocarbon end group comprising at least one amine group, said process being carried out in the presence of at least one activating agent selected from the group consisting of thionyl chloride and oxalyl dichloride.

10. A crosslinkable composition (CC) comprising:
at least one crosslinkable fluoropolymer [polymer (FC)] according to claim 1, and
at least one additive selected from the group consisting of crosslinking co-agents and crosslinking initiators.

11. The crosslinkable composition (CC) according to claim 10, wherein the crosslinking co-agent is a poly(meth) acrylic compound (PMA) comprising at least two end groups of formula (XI):

—O—C(O)—C($R_7$)=$CR_8R_9$ (XI)

wherein each of $R_7$, $R_8$ and $R_9$, equal to or different from each other, is independently a hydrogen atom or a $C_1$-$C_3$ hydrocarbon groups.

12. The crosslinkable composition (CC) according to claim 10, wherein the crosslinking initiator is a photoinitiator (PI) or a thermal initiator (TI).

13. The crosslinkable composition (CC) according to claim 12, wherein the crosslinking initiator is a photoinitiator (PI) selected from the group consisting of alpha-hydroxyketones, phenylglyoxylates, benzyldimethyl ketals, alpha-aminoketones and bis acyl phosphines.

14. A crosslinkable fluoropolymer film [film (FC)] comprising at least one crosslinkable fluoropolymer [polymer (FC)] according to claim 1.

15. A process for the manufacture of a crosslinked fluoropolymer film [film (FCC)], said process comprising:
(i') providing the crosslinkable fluoropolymer film [film (FC)] according to claim 14, and
(ii') crosslinking the film (FC) provided in step (i').

16. The process according to claim 15, wherein under step (ii') the crosslinkable fluoropolymer film [film (FC)] provided in step (i') is crosslinked either by UV treatment under UV radiation or by thermal treatment.

17. A crosslinked fluoropolymer film [film (FCC)] obtainable by the process according to claim 15, said crosslinked fluoropolymer film [film (FCC)] comprising at least one crosslinked fluoropolymer [polymer (FCC)].

18. An electrical or electronic device comprising at least one crosslinked fluoropolymer film [film (FCC)] according to claim 17.

19. A crosslinkable fluoropolymer film [film (FC)] comprising at least one crosslinkable composition (CC) according to claim 10.

20. A crosslinkable fluoropolymer film [film (FC)] consisting of at least one crosslinkable fluoropolymer [polymer (FC)] according to claim 1.

* * * * *